Patented June 30, 1925.

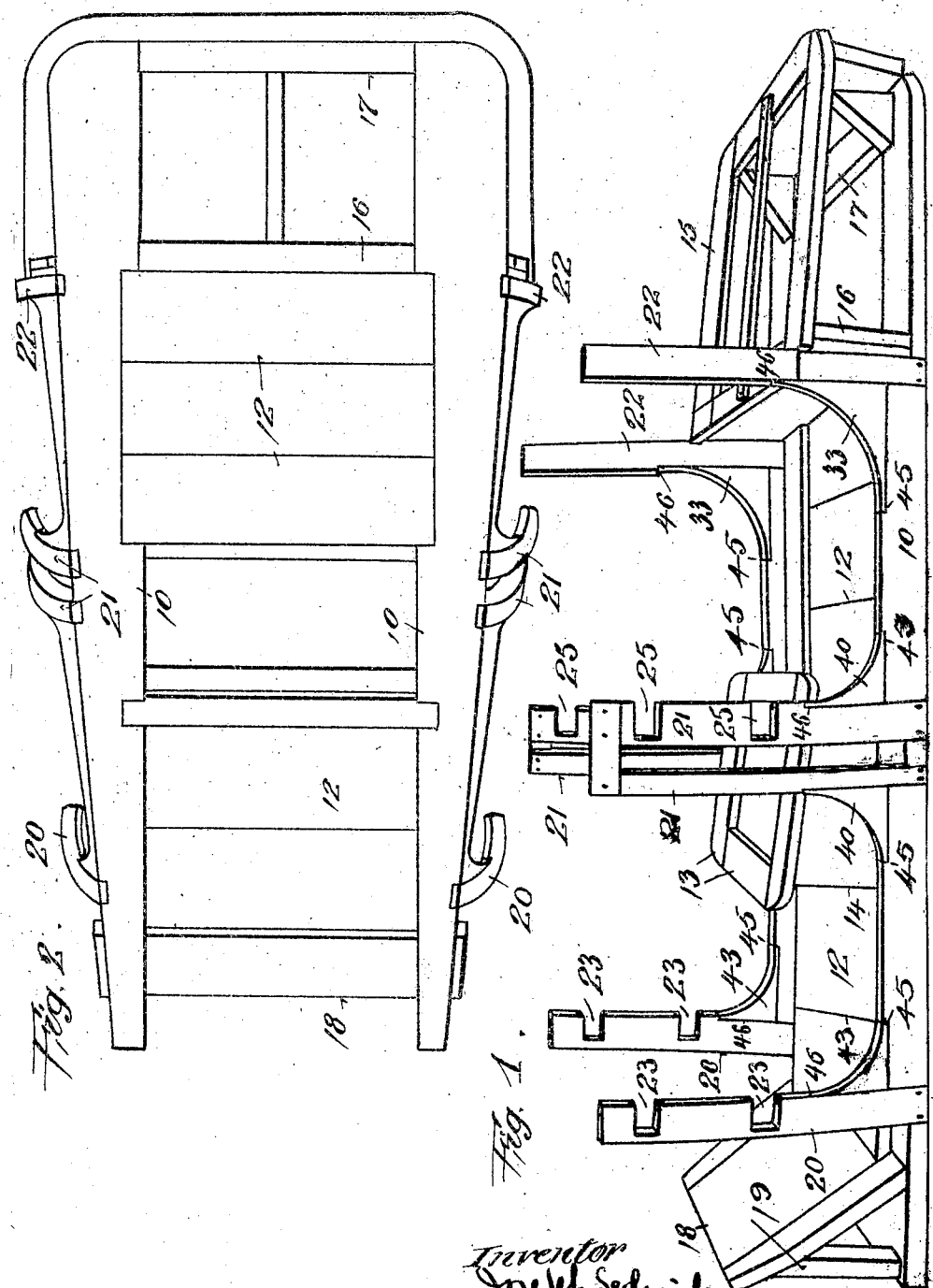

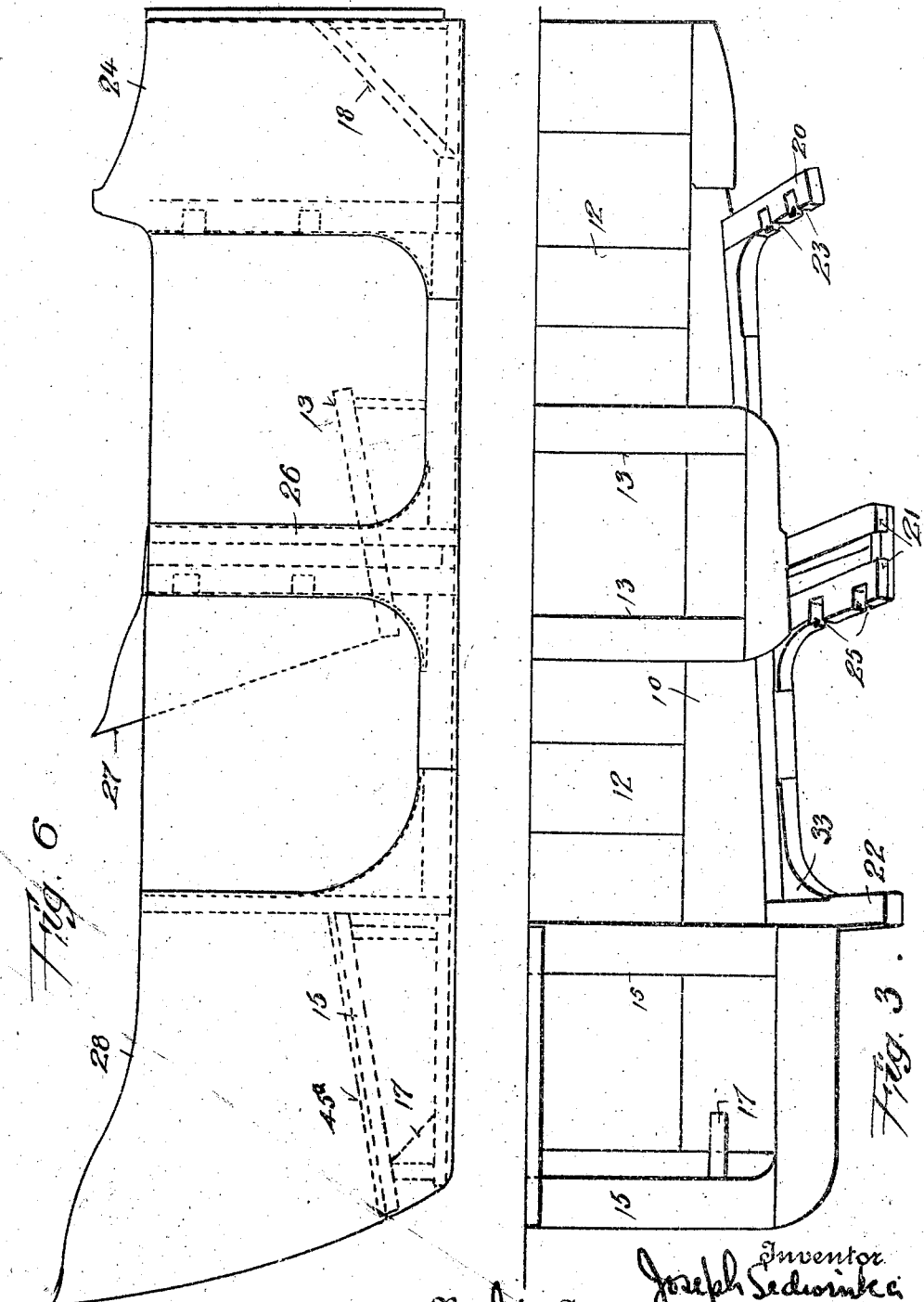

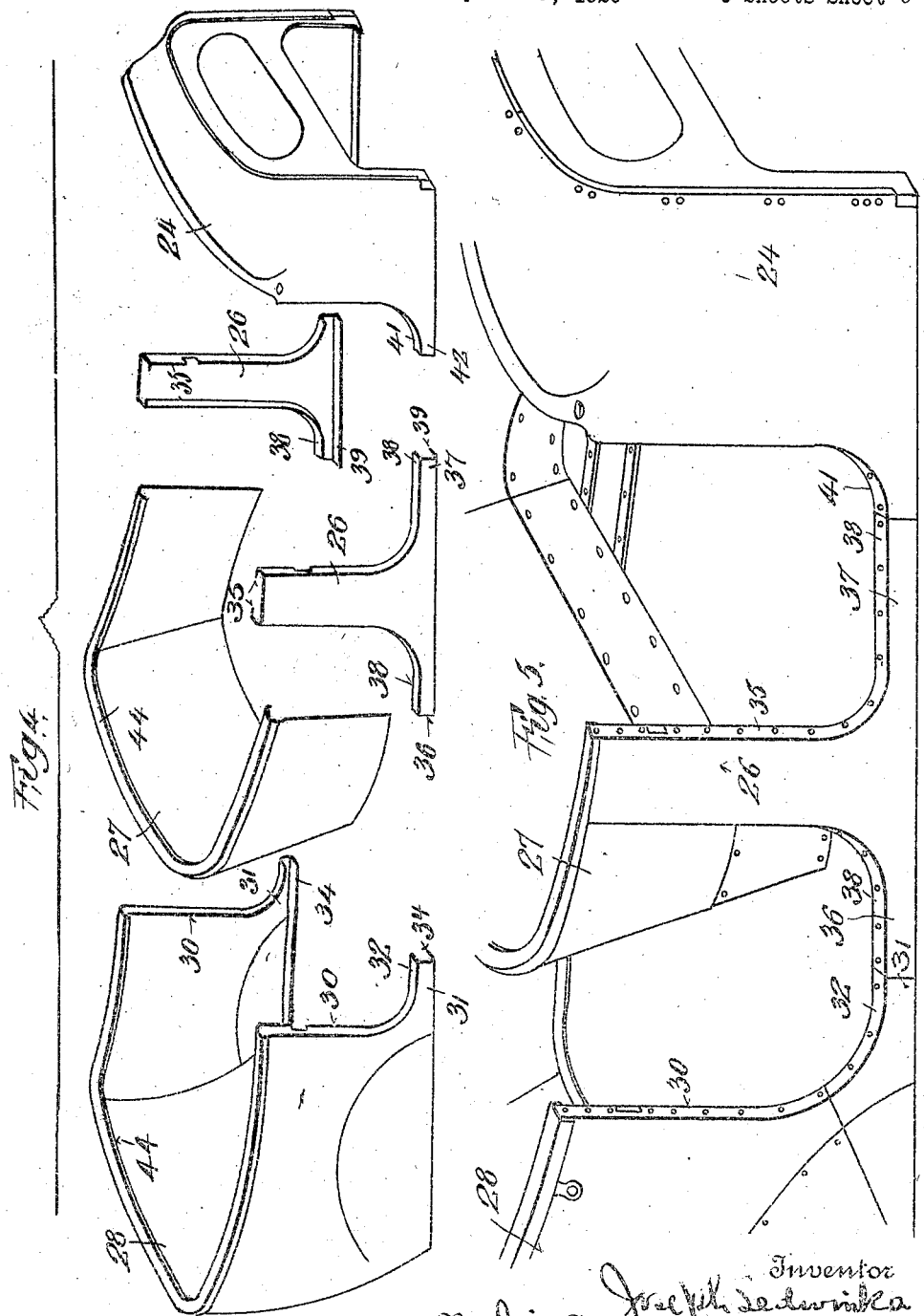

1,543,857

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

COMPOSITE BODY FOR AUTOMOBILES.

Application filed April 28, 1920. Serial No. 377,249.

*To all whom it may concern:*

Be it known that I, JOSEPH LEDWINKA, a citizen of the United States, residing at Philadelphia, county of Philadelphia, and State of Pennsylvania, have made a certain new and useful invention in Composite Bodies for Automobiles, of which the following is a specification.

This invention relates to composite bodies for automobiles.

The object of the invention is to provide a composite body for automobiles which is simple in construction, efficient in use and economical to construct.

A further object of the invention is to provide a supporting skeleton frame of wood for an automobile body to which are applied sheet steel stampings of the various parts required to make the complete composite body, and in such type of body to avoid the use of curved or wooden frames and to secure simplicity of construction.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings,—

Fig. 1 is a view in side elevation of the wooden frame for a composite body embodying the principles of my invention.

Fig. 2 is a bottom plan view of the same.

Fig. 3 is a top plan view of a portion of the same.

Fig. 4 is a view in perspective showing in disassembled relation the various sheet metal stampings employed in the composite body embodying my invention.

Fig. 5 is a similar view showing the sheet metal stampings in their assembled relation.

Fig. 6 is a view in side elevation showing a portion of the completed composite body.

In the manufacture of certain types of automobile bodies it has heretofore been a common practice to construct a wooden frame and to apply sheet metal stampings thereto to produce a composite body. In such structures as heretofore carried out bent or curved wooden members are employed in building up a skeleton frame to receive the sheet metal panels constituting the seat backs and tonneau. The provision of curved or bent wooden sections adds very substantially and materially to the cost of construction of the wooden part of the composite frame necessitating the employment of steaming apparatus in which the wooden pieces are steamed prior to bending as well as bending devices to effect the bending of the thin wooden pieces into the desired curved contour of the seat backs. It is among the special purposes of my present invention to provide a composite body which eliminates these and other objections encountered heretofore in the construction of composite bodies.

In carrying out my invention I construct a wooden skeleton frame of plain substantially straight pieces to constitute the bed frame, seat supports and vertical side posts, but I eliminate any frame for receiving the seat backs whether of a runabout or of a touring car type of body, and I apply sheet steel stampings to such frame, which, when applied, are welded or otherwise secured together to constitute in effect an integral exterior sheathing for the wooden frame of the composite body. In this manner I am enabled to employ easily manufactured sheet steel stampings, and to avoid the necessity for employing curved frames or railings for supporting the seat backs, and hence I am enabled to produce a very greatly simplified structure of wooden frame work which is composed of simple, easily constructed and assembled frame pieces, thereby not only reducing the weight but substantially reducing the cost of construction of composite bodies.

Referring to the accompanying drawings, 10 designates longitudinally extending wooden members constituting the side sills of the wooden frame. These side members are connected together by cross boards 12 constituting floor boards for the body. Seat supporting frames are also built up of wooden strips, those constituting the front seat being constructed in the form of the rectangular shaped frame indicated at 13, see Figs. 1 and 3, supported on risers 14, and in the case of the rear seat the rectangular frame 15 is supported upon risers 16 and a supporting trestle 17, the risers 14 and 16 and the trestle 17 being suitably mounted on the side stringers 10. The front and rear seat supporting structures are built up of plain wooden strips requiring no special bending and secured together in the ordinary manner. Suitably secured to the front end of the wooden frame work is the inclined toe board 18 which is supported in vertically inclined position by posts 19 carried by the stringers 10. Suitably secured to the side stringers 10 are vertically disposed wooden posts 20, 21, and 22, the upper body portions of which are unbraced and freely disposed. These posts are arranged in pairs at opposite sides of the wooden frame and constitute supports to receive the sheet steel stampings constituting the shell or sheathing of the composite body. The posts 20 form the door posts for the front doors of the body and to which the front doors are hinged, said posts being formed with recesses 23 to receive the door hinges. They also constitute supports for the cowl stamping 24. The set of posts 21 constitute the door posts between the front and rear seats, and the rear doors are designed to be hinged thereto, said posts being provided with recesses 25 to receive the rear door hinges. The stampings 26 are designed to be applied to these posts 21, and said posts also constitute supports for the front seat back stamping 27. The pair of posts 22 constitute the body posts at the rear edge of the rear doors and afford means for receiving and retaining the tonneau or rear seat back stamping 28 in the case of a touring car body.

The body shell stampings 24, 26, 27, 28, are stamped out to the required shape and curvature to form the outer sheet metal shell of the body with the desired curvature, and in practice these stampings are made separately and are applied to the wooden skeleton frame of the composite body and secured thereto in any suitable or convenient manner, and are secured together by electrically welding them, or otherwise, so as to form in effect an integral sheathing or shell. These stampings are likewise suitably engaged to the frame posts 20, 21, 22, and when applied to the wooden frame and secured thereto and to each other they cooperate with the skeleton wooden frame to constitute a complete composite body of exceedingly simple structure which is light in weight and which is strong and durable and economical to manufacture. Of course the shell stampings may be varied in their shape and contour to conform to any desired stream line effect or type of car body, and these stampings being of standard shape for any particular design of car body can be produced and manufactured in quantities expeditiously and economically. In securing the body shell stampings, the tonneau or rear seat back stamping, including the seat back proper and sides thereof as indicated at 28, see Fig. 4, is applied around the rear seat frame structure 15 with the front vertical inturned flanges 30 of such stamping applied over the front vertical edges of the posts 22 and secured thereto in any convenient manner. Likewise, the forwardly extending portions 31 of the stamping 28 with its upper inturned flange portion 32 extends forwardly along the side sills 10 of the skeleton frame, the horizontal flange 32 forming a continuation of the vertical flange 30 of stamping 28 and extending over a curved wooden gusset 33 of the wooden frame. The lower horizontally extending inturned flange 34 of the stamping 28 is designed to engage underneath the lower edge of the stringer 10 and is suitably secured thereto. It will be observed that the stamping 28 is supported entirely by the seat frame structure 15 and posts 22 and longitudinal sill members 10 of the wooden frame, and hence I avoid the necessity of employing the usual curved wooden frames for the seat backs. By dispensing with these curved or bow-shaped seat back supporting frame portions I am enabled to greatly reduce the cost of manufacture of the composite body without impairing the efficiency or rigidity of the composite body when completed. Likewise, the stampings 26 are provided with vertically extending inturned flange portions 35 which engage over the inner vertical edges of the posts 21 to which said flanges are secured, and said stampings 26 are formed with longitudinally extending portions 36, 37, the portions 36 thereof forming a junction with the forwardly extending portions 31 of the rear stamping 28, and the inturned flanges 38, 39, of the extensions 36, 37, cooperate with the flanges 32 on the rear panel and corresponding flanges 41 on the cowl stamping 24 to constitute the rear and front door openings, the flanges 38 engaging over gussets 40 of the wooden framework in the door openings. The forwardly extending side portions of the stamping 27 are likewise secured at their front vertical edges to the post structures 21. The cowl panel stamping 24 is likewise formed with inturned flanges 41 on rearwardly extending portions 42 which conform to and form junctions with and substantially continuations of the extensions 37, and flanges 38 of the post stampings 26 at the front door opening, the flanges 41 of the cowl stamping engaging over gussets 43, and the rear vertical edges of the cowl stamping engage over the rear vertical edges of the posts 20. In applying the stampings to the wooden skeleton frame said stampings are joined together by electric spot welding or otherwise into an integral shell or sheathing.

If desired, the upper edges of the stampings 27, 28, may be formed in the usual manner with the flanges 44 for the application thereto of the usual upholstery or seat, side and back cushions.

Of course it will be understood that the usual sheet steel seat pans indicated in dotted lines at 45ª in Fig. 6 may be placed upon the seat frames 13, 15, to receive the usual seats for the body.

The upper edges of the longitudinal wooden sills and the adjacent vertical edges of the posts are recessed, as indicated at 45, 46, Fig. 1, to form seats in which the edges of the gussets 33, 40 and 43 are received.

From the foregoing description it will be seen that I provide an exceedingly simple composite body structure, which is economical to construct and easily assembled, and in which the weight is reduced to a minimum.

Having now set forth the objects and nature of my invention, what I claim as new and useful and of my own invention and desire to secure by Letters Patent is,—

1. In a composite body structure for automobiles, longitudinally extending side sills, door posts extending substantially vertically therefrom and having their upper ends freely disposed, sheet metal body stampings provided with integral reinforcements extending from the free body of one post to the free body of the other and having inturned flanges at the edges thereof for supporting engagement with the sills and posts, and gussets interbracing the posts and the sills and also engaging the inturned flanges of said stampings and contoured to the shape thereof, whereby the gussets in addition to bracing the posts constitute a means of attaching, bracing and retaining the contour of the stampings.

2. In a composite body structure for automobiles, a framework disposed in substantially a horizontal plane, door posts extending substantially vertically from the sides of said framework, the upper bodies of said posts being freely disposed, means at the juncture of said posts and framework to prevent lateral displacement of the lower ends of said posts, in combination with sheet metal body tsampings provided with integral reinforcements extending from the free body of one post to the free body of the other whereby upon joinder of said framework and body stampings said reinforcements are adapted to laterally brace the upper ends of the posts.

In testimony whereof I have hereunto set my hand on this 24th day of April A. D., 1920.

JOSEPH LEDWINKA.